United States Patent [19]

Williams, III et al.

[11] 4,107,147

[45] Aug. 15, 1978

[54] POLYSULFONEIMIDES

[75] Inventors: Frank J. Williams, III, Scotia; Paul E. Donahue, Schenectady, both of N.Y.

[73] Assignee: General Electric Company, Schenectady, N.Y.

[21] Appl. No.: 830,114

[22] Filed: Sep. 2, 1977

[51] Int. Cl.² .............................................. C08G 73/10
[52] U.S. Cl. ..................................... 528/172; 528/30; 528/38; 528/42; 528/125; 528/174; 528/183; 528/211; 528/220; 528/226; 528/229; 528/352
[58] Field of Search .......... 260/47 CP, 49, 65, 78 TF, 260/465 E, 63 R

[56] References Cited

U.S. PATENT DOCUMENTS

| | | | |
|---|---|---|---|
| 3,933,749 | 1/1976 | Williams | 260/47 CP |
| 3,933,862 | 1/1976 | Williams | 260/346.3 |
| 3,989,670 | 11/1976 | Takekoshi et al. | 260/47 CP |

*Primary Examiner*—Lester L. Lee
*Attorney, Agent, or Firm*—Joseph T. Cohen; Charles T. Watts

[57] ABSTRACT

Polysulfoneimides are provided and a method for making such materials. Aromatic bis(sulfoneanhydrides) are reacted with organic diamines to yield polymers which are useful in high temperature applications.

7 Claims, No Drawings

POLYSULFONEIMIDES

The present invention relates to polysulfoneimides which can be made by effecting reaction between an aromatic bis(sulfoneanhydride) and an organic diamine.

The polysulfoneimides of the present invention comprise the following units:

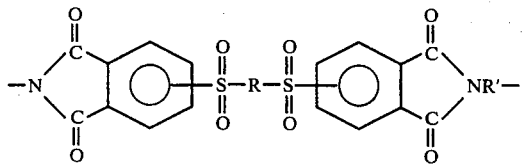
I where R and R' are divalent aromatic organic radicals having from 6-20 carbon atoms and include divalent organic radicals selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxanes, and (c) divalent radicals included in the formula,

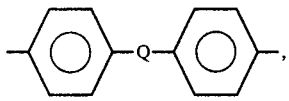

where Q is a member selected from the class consisting of divalent radicals of the formulas $-C_yH_{2y}-$,

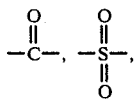

—O—, and —S—, and $y$ is a whole number from 1 to 5, inclusive.

The polysulfoneimides of formula I can be made by various methods. One procedure involves the reaction of an aromatic bis(sulfoneanhydride) of the formula,

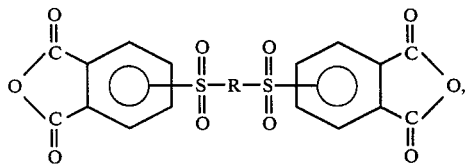
II with an organic diamine of the formula, in the melt,

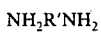 III at temperatures of at least 100° C., where R and R' are as previously defined.

Another method which can be used to make the polysulfoneimide is by the reaction of the bis(sulfoneanhydride) of formula II and the organic diamine of formula III in the presence of a phenolic solvent at temperatures of from 100° to 250° C. and preferably 130° to 200° C. Water of reaction is removed to facilitate polysulfoneimide formation. A mixture of a low boiling and higher boiling solvents also can be used which serves as an azeotroping agent for the formed water.

The aromatic bis(sulfoneanhydride) of formula II, and methods for making the same are shown in our copending application Ser. No. 830,113, filed concurrently herewith and assigned to the same assignee as the present invention. Included among the dianhydrides which can be used to make the polymers are, for example,

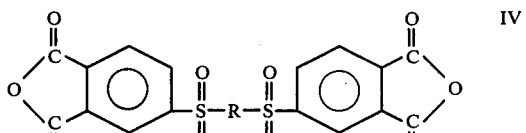
IV

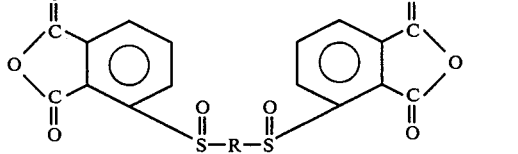
V

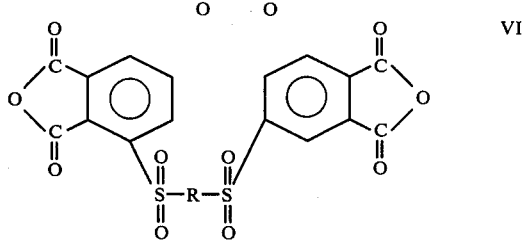
VI where R is as previously defined.

A method for making the aromatic bis(thioetheranhydride) as shown in our copending application Ser. No. 830,113, involves oxidizing an aromatic dithiodianhydride of the formula,

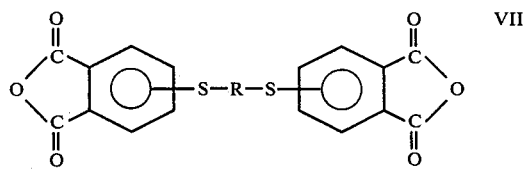
VII to yield the tetraacid of the formula,

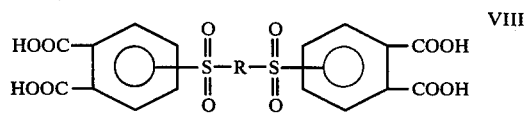
VIII where R is as previously defined, and then dehydrating the latter to the dianhydride of formula II. By reference the disclosures and teachings required to make the disulfone dianhydrides as shown in our copending application Ser. No. 830,113 and in U.S. Pat. No. 3,933,862 issued Jan. 20, 1976 (which describes precursor dithiodianhydrides used to make the disulfone dianhydrides) are incorporated in the instant application.

Included among the organic diamines or mixtures of organic diamines of formula III which may be employed in making the polysulfoneimides of the present invention are, for instance, m-phenylenediamine (m-PDA);
p-phenylenediamine;
4,4'-diaminodiphenylpropane;
4,4'-diaminodiphenylmethane (DDPM); benzidine;
4,4'-diaminodiphenyl sulfide;
4,4'-diaminodiphenyl sulfone;

4,4'-diaminodiphenyl ether;
1,5-diaminonaphthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
hexamethylenediamine (HMDA);
heptamethylenediamine;
nonamethylenediamine;
bis-(3-aminopropyl)tetramethyldisiloxane, etc.

The polysulfoneimides of formula I can be made by a melt polymerization procedure involving the aromatic bis(sulfone anhydride) of formula II hereinafter referred to as "dianhydride" and organic diamine of formula III. An inert atmosphere such as nitrogen can be employed to form a homogeneous melt, and water as it is formed can be removed therefrom.

Temperature of the melt is maintained above the glass transition temperature of the resulting polyimide but below about 300° C. Preferably, a temperature in the range of from 200° C. to 280° C. can be used. Polymerization can be facilitated by purging the melt with an inert gas such as nitrogen. A reduced pressure also can be used to remove water. During polymerization constant agitation of the melt such as by stirring facilitates formation of the polysulfoneimide.

Substantially equal moles of dianhydride (or mixtures of dianhydrides) and organic diamine usually provide optimum results. Effective amounts are from about 0.9 to 1.1 moles of organic diamine, per mole of dianhydride. Mono-functional organic amines such as aniline, or organic anhydrides such as phthalic anhydride, provide molecular weight control for the polymer. Low molecular weight polysulfoneimides can be employed to form copolymers. From 0.1 to 80 mole percent of other dianhydrides (e.g., pyromellitic dianhydride, 4,4'-isopropylidenebis(3- and 4-phenyleneoxyphthalic anhydride) as described in U.S. Pat. No. 3,972,902 issued Aug. 3, 1976, etc.) or mixtures of diamines, based on the total moles of reactants, can be employed.

Polysulfoneimides having greater than 1, e.g., from 10 to 10,000 or more average repeating units of formula I can be formed. These polymers can be blended with various fillers such as finely divided silica, glass fibers, carbon whiskers, perlite, etc. The resulting filled compositions can, on a weight basis, have a proportion of from about 1 part to 200 parts of filler per hundred parts of polysulfoneimide. The blending of the filler with the polysulfoneimide can be achieved by adding the filler prior to forming the melt or directly to the melt. Stirring can be effected with standard agitating means to facilitate blending the ingredients.

In order that those skilled in the art may better understand how the present invention may be practiced, the following examples are given by way of illustration and not by way of limitation.

EXAMPLE 1

A mixture of 2.25 grams of 4,4'-bis[3,4-dicarboxyphenylsulfonyl] diphenylether dianhydride prepared in accordance with the description in our copending application Ser. No. 830,113, 0.7706 gram methylene dianiline having the formula,

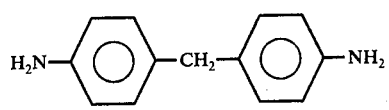

and 0.0226 gram phthalic anhydride was stirred with 20 ml m-cresol and 10 ml toluene in a reaction vessel maintained in a bath having a temperature of 215° C. under a nitrogen atmosphere. The water was removed by azeotropic distillation and the temperature in the reaction vessel itself was maintained at about 170° C. by adding or distilling out toluene. After about 16 hours of heating with continuous stirring, the system was cooled to room temperature and diluted with 15 ml chloroform. The solution thus obtained was added to 600 ml methanol and the resulting solid material which precipitated was collected by filtration, washed thoroughly and dried and analyzed by infrared to give 1.90 grams of a solid polymer comprising recurring units of the formula

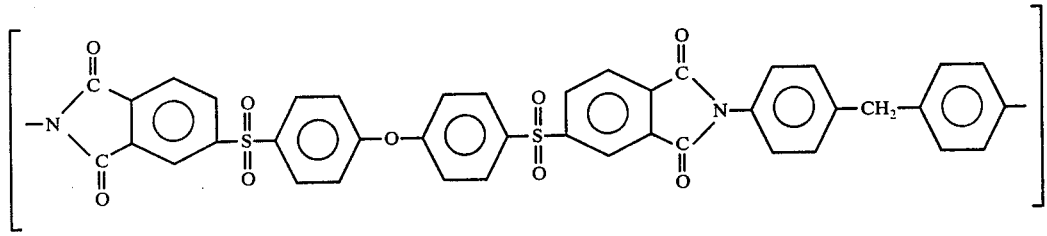

where $n$ is a whole number greater than 1.

EXAMPLE 2

A mixture of 3 grams of the dianhydride 2,4-bis-[3,4-dicarboxy-phenylsulfonyl] chlorobenzene dianhydride having the formula

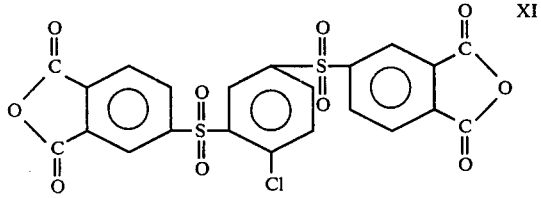

prepared in accordance with the description in our copending application Serial. No. 830,113, and 0.6544 gram hexamethylenediamine was stirred in a reaction vessel immersed in a 280° C. oil bath under a nitrogen atmosphere. After 5 minutes the temperature was raised to 300° C. and a vacuum was applied to assist in the removal of water. After 25 minutes at 300° C., the mixture was cooled to room temperature and dissolved in m-cresol. The m-cresol solution was added to 600 ml methanol and the resulting precipitate was removed by filtration and dried to give the desired polysulfoneimide comprising recurring units of the formula

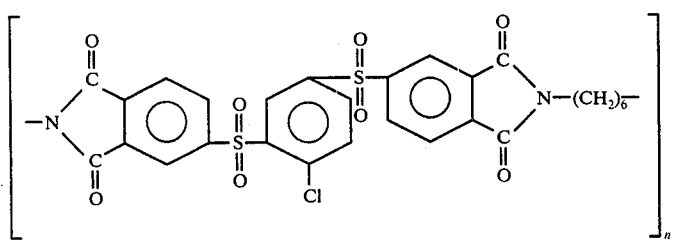

where $n$ is a whole number greater than 1. The identity of this polymer was established by infrared.

EXAMPLE 3

In this example the dianhydrides used in Examples 1 and 2 were reacted with various organic diamines employing the same molar ratios of ingredients and reaction conditions described in Examples 1 and 2. The following Table I shows the reactants used together with the conditions employed. In all the tests in this example, 2 weight percent chain stopper phthalic anhydride, based on the combined weight of the primary ingredients, was employed.

TABLE I

| Test No. | Dianhydride | Diamine | Reaction Conditions |
|---|---|---|---|
| 3a | Used in Ex. 1 | m-Phenylene diamine | Same as in Ex. 1 |
| 3b | Used in Ex. 1 | Hexamethylene diamine | Same as in Ex. 2 |
| 3c | Used in Ex. 2 | m-Phenylene diamine | Same as in Ex. 1 |
| 3d | Used in Ex. 2 | Diamine of Formula IX | Same as in Ex. 1 |

The following Table II shows the properties of the solid polymers obtained in Examples 1 to 3. The TGA values were obtained by heating the polymers in both air and nitrogen. The stability of the polymer is shown in the column reciting the percent weight of polymer remaining after heating the polymer from 250° to 800° C. in nitrogen at the rate increase of 10° C. per minute. Finally, the intrinsic viscosity (IV) was determined in m-cresol at about 25° C. The oxygen index values (OI) were determined in accordance with the method described in U.S. Pat. No. 3,519,697 issued July 7, 1970, column 5, which by reference is made part of the disclosures of the present application.

TABLE II

| Test No. | Tg (° C.) | TGA (° C.) | % Wt. Left at 800° C. (N₂) | IV dl/g | OI |
|---|---|---|---|---|---|
| Ex. 1 | 276 | — | — | 0.39 | 38 |
| Ex. 2 | 175 | 350 (air and N₂) | 32 | insoluble | 25 |
| Ex. 3a | 271 | 475 (air) 500 (N₂) | 48 | 0.29 | 38 |
| Ex. 3b | 170 | 412 (air) 430 (N₂) | 16 | 0.20 | 34 |
| Ex. 3c | 240 | 430 (air and N₂) | 42 | 0.17 | 44 |
| Ex. 3d | 274 | 425 (air and N₂) | 52 | 0.30 | 40 |

EXAMPLE 4

A mixture of 1.322 grams (0.002538 mole) of 4,4'-isopropylidene-bis(4-phenyleneoxyphthalic anhydride), 0.500 gram (0.000846 mole) of the sulfone dianhydride used in Example 1, 0.366 gram of m-phenylene diamine (0.00338 mole), 15 ml of m-cresol and 8.0 ml of toluene (dried over calcium hydride) was heated at reflux under a nitrogen atmosphere. The refluxing vapor was passed through a recirculating trap containing molecular sieves to remove water. The internal temperature of the reaction mixture was slowly raised to 170° C. by removal of some toluene. The mixture was stirred for 16 hours at 170° C. and after cooling, the mixture was added to 600 ml methanol. The resulting polymeric material was recovered by filtration, washed four times with methanol, and dried in a vacuum oven at 125° C. to give 2.13 grams of a polymer composed of recurring units of the formulas

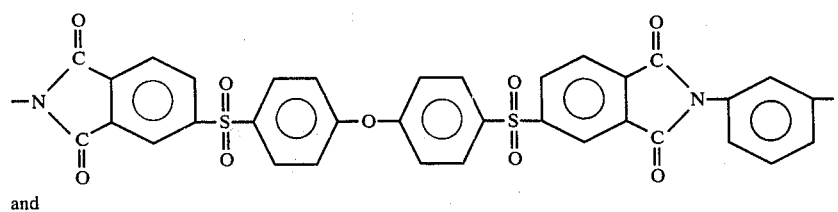

and

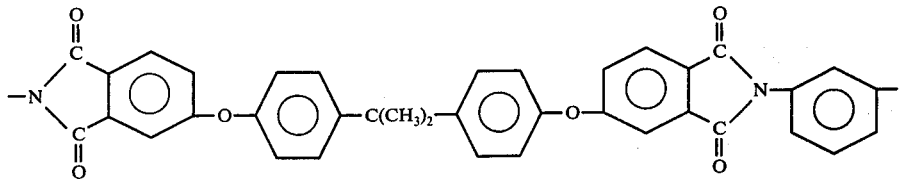

where the mole ratios of the units were approximately equivalent to the mole ratios of the dianhydrides used. The structure of the polymer was established by infrared. This composition had an intrinsic viscosity (m-cresol) of 1.18 dl/gram, a Tg of 236° C., and a TGA of 490° C. in nitrogen and 450° C. in air. Fifty-two percent of the polymer was left after heating at 800° C in the manner described for Table II.

It will of course be apparent to those skilled in the art that in addition to the dianhydrides of formula II and the organic diamines of formula III which were employed in the foregoing examples, other dianhydrides and organic diamines can be employed in their place without departing from the scope of the invention. Many examples of such dianhydrides and organic diamines have been given previously. The conditions of reaction and molar concentrations of the ingredients used to make the polysulfoneimides can be varied within the description previously described for such purposes.

The compositions of the present invention have application in a wide variety of physical shapes and form, including their use as films, molding compounds, coatings, etc. Thus, the compositions of the present invention can be used in automobile and aviation applications for decorative and protective purposes, as high temperature electrical insulation, for motor slot lines, in transformers, as dielectric capacitors, as coil and cable wrappings, for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Alternatively, solutions of the compositions herein described can be coated on electrical conductors such as copper, aluminum, etc., and thereafter the coated conductor can be heated at elevated temperatures to remove the solvent and to effect curing of the compositions thereon. If desired, an additional overcoat may be applied to such insulated conductors including the use of polymeric coatings, such as polyamides, polyesters, silicones, polyvinylformal resins, epoxy resins, other polyimides, polytetrafluoro-ethylene, etc.

The compositions herein disclosed and claimed may be suitably incorporated with other materials to modify the properties of the latter or in turn they may be modified by the incorporation of the materials. For example, they may be compounded with substances such as natural or synthetic rubbers, synthetic resins such as phenol-aldehyde resins, alkyd resins, etc.; cellulosic materials such as paper, organic esters of cellulose such as cellulose acetate, cellulose ethers, etc. Because of the favorable oxygen index of these polymeric compositions, the incorporation of these polymers in other polymers which may not be so favorably disposed, for instance, polycarbonate resins, polyphenylene oxide resins, polybutylene terephalate resins, etc. in amounts ranging from 5 to 75%, by weight, based on the total weight of the polysulfoneimide and the aforesaid resins, can improve the properties of the resins in which the polysulfoneimides of the present invention are incorporated.

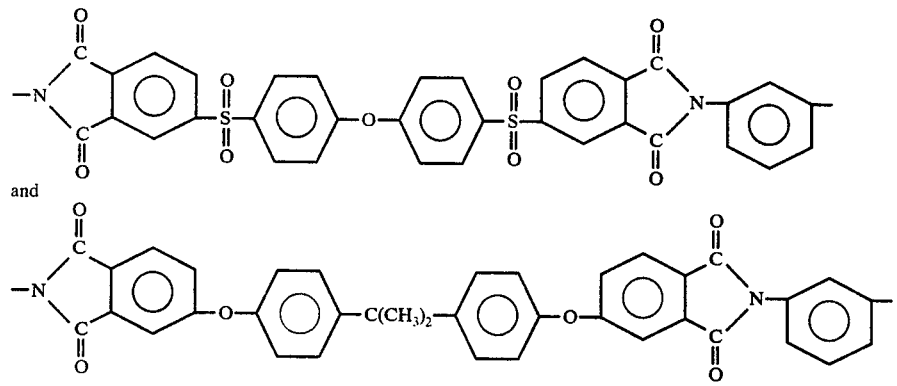

What we claim as new and desire to secure by Letters Patent of the United States is:

1. A polysulfoneimide consisting essentially of units of the formula

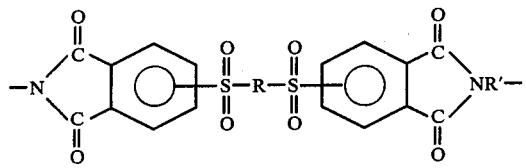

where R and R' are divalent aromatic organic radicals having from 6–20 carbon atoms selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included in the formula,

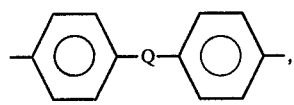

where Q is a member selected from the class consisting of divalent radicals of the formulas —$C_yH_{2y}$—,

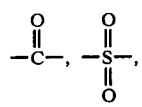

—O—, and —S—, and y is a whole number from 1 to 5, inclusive.

2. A polysulfoneimide in accordance with claim 1, consisting essentially of units of the formula

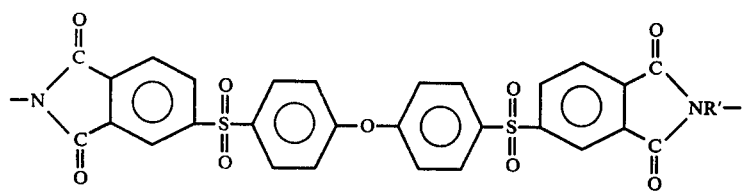

where R' has the meaning in claim 1.

3. A polysulfoneimide in accordance with claim 1, consisting essentially of units of the formula

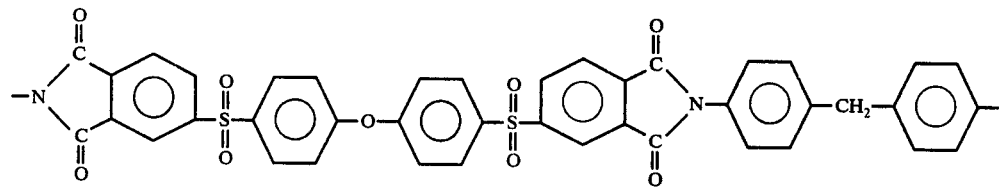

where R' has the meaning in claim 1.

4. A polysulfoneimide consisting essentially of the formula

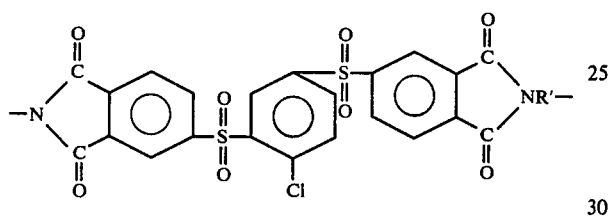

5. A polysulfoneimide consisting essentially of units of the formula

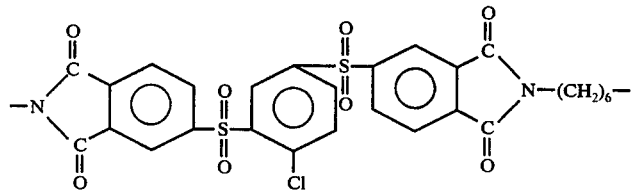

6. A polysulfoneimide in accordance with claim 1, where R is

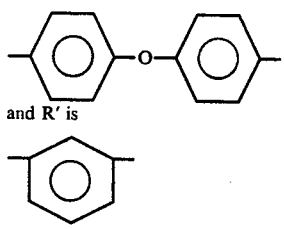

and R' is

7. A copolymeric polysulfoneimide consisting essentially of units of the formulas